United States Patent Office 3,278,570
Patented Oct. 11, 1966

3,278,570
MOLYBDENUM PENTACARBONYL COMPOUNDS AND PROCESS FOR PREPARING SAME
Geoffrey Wilkinson, London, and Edward W. Abel, Bristol, England, assignors to Ethyl Corporation, New York, N.Y., a corporation of Virginia
No Drawing. Filed Apr. 11, 1961, Ser. No. 102,121
6 Claims. (Cl. 260—429)

This invention relates to novel organometallic compounds. More specifically, the invention relates to ionic compounds of molybdenum which contain a molybdenum pentacarbonyl halide anion which is bonded to a cation. In certain cases, our ionic compounds are stabilized by the presence of specified ethers or ketones in the molecule. Also included as a part of our invention is a method for preparing the above mentioned compounds.

An object of this invention is to provide novel organometallic compounds of molybdenum. A further object is to provide compounds in which a cation is bonded to a molybdenum pentacarbonyl halide anion which compound is stabilized in certain cases by the presence of specified ethers or ketones in the molecule. An additional object is to provide a method for making the above mentioned compounds. Still further objects will become apparent from the following discussion and claims.

The objects of our invention are accomplished by reacting a halide salt with molybdenum hexacarbonyl in the presence of a solvent. A first class of applicable halide salts which may be employed in forming our novel compounds are alkali metal-halide salts such as sodium iodide, potassium bromide, lithium fluoride, rubidium iodide, and cesium chloride. When the alkali metal halide is used as a reactant, the compounds which are formed have the following generic formula:

$$M(Y)_aMo(CO)_5X$$

in which M is an alkali metal cation and Y is a tridentate non-cyclic ether, a bidentate non-cyclic ether, or an aliphatic hydrocarbon ketone such as cyclopentanone or diethyl ketone which preferably have a normal boiling point ranging from about 60 to about 200° C. The ketone may be either cyclic or non-cyclic in nature. "$a$" is an integer ranging from two to three, and X is a halogen.

In the above described compounds in which an alkali metal cation is present in the molecule, the nature of the solvent is quite critical to the formation of the compounds. The most preferred solvents for use in forming these compounds are the tridentate non-cyclic ethers such as diethyleneglycol dimethylether, diethyleneglycol diethylether, diethyleneglycol dipropylether, and dipropylene glycol diethylether. These particular solvents are preferred since their use is found to stabilize the products which are formed, and to decrease the time required for reaction as compared with other suitable solvents.

Another class of solvents which we can employ in our process involving reaction between an alkali-metal halide and molybdenum hexacarbonyl are the bidentate non-cyclic ethers such as dimethoxy ethane, diethoxy ethane, dipropoxy ethane, and the like. These solvents also stabilize the ionic alkali-metal molybdenum pentacarbonyl halide compounds. When employing these solvents, however, a longer reaction time is required than when using a non-cyclic tridentate ether.

A still further class of solvents which we can employ in our process for reacting an alkali-metal halide and molybdenum hexacarbonyl are cyclic and acyclic aliphatic hydrocarbon ketones such as cyclopentanone and diethyl ketone which preferably have a normal boiling point ranging from about 60 to about 200° C. The ketone solvent is not as desirable as the bidentate non-cyclic ethers or the tridentate non-cyclic ethers, as enumerated above, since the ketone is less capable of stabilizing the ionic alkali metal molybdenum pentacarbonyl halide compound which is formed.

The alkali metal molybdenum pentacarbonyl halide compounds produced by our process are somewhat unique and differ greatly from conventional etherates. In a conventional etherate compound, the ether is loosely bound in the molecule so that it is easily removed. In contrast, the ether present in our alkali metal molybdenum pentacarbonyl halide compounds is firmly bound within the molecule so that it cannot be easily removed.

A further phase of our invention involves the preparation of tetraalkylammonium molybdenum pentacarbonyl halide compounds. These compounds, surprisingly, do not require the presence of an ether or ketone in the molecule in order to stabilize the compound. They are formed readily by reaction of a tetraalkylammonium halide with molybdenum hexacarbonyl in the presence of an inert solvent. Since the solvent molecule does not become incorporated into the compound produced, the nature of the solvent is not critical. Thus, in addition to ethers and ketones, we can employ conventional organic solvents such as n-hexane, n-heptane, n-octane, and the like.

The alkyl groups which are connected to the nitrogen atom in the tetraalkylammonium halide reactant are preferably lower alkyl groups containing from one to about 10 carbon atoms each. Typical of the compounds produced, containing tetraalkylammonium cations which contain lower alkyl groups, are tetramethylammonium molybdenum pentacarbonyl bromide, tetradecyl ammonium molybdenum pentacarbonyl iodide, tetrapropylammonium molybdenum pentacarbonyl chlorides, tetrahexylammonium molybdenum pentacarbonyl chloride, and the like. Also, our compounds can contain ammonium cations in which mixed alkyl groups are bonded to the nitrogen atom, such as, for example, in the case of trimethylbutyl ammonium molybdenum pentacarbonyl iodide.

Our compounds, as described above, are formed by reacting either an alkali metal halide salt or a tetraalkyl ammonium halide salt with molybdenum hexacarbonyl in the presence of a solvent. If the reactant is an alkali metal halide, the solvent must be a non-cyclic tridentate ether, a non-cyclic bidentate ether, or an aliphatic hydrocarbon ketone, all as described above. When the reactant is a tetraalkyl ammonium halide as described above, the nature of the solvent is not critical and any inert solvent may be employed. Our process is preferably carried out in the presence of an inert atmosphere such as nitrogen, argon, krypton, neon, and the like. Preferably nitrogen is used as the inert atmosphere since it is cheaper and more plentiful than the other inert gases. The reaction temperature is not critical and can range from about 80 to about 200° C. Preferably, the reaction temperature is controlled at about 100° C.

Our process is normally conducted at atmospheric pressures, but may be conducted at higher pressures if desired. In the event that the solvent is relatively low boiling, it may be advantageous to carry the reaction out under pressure since this enables the use of higher temperatures without solvent loss. Although not necessary, in some cases agitation of the reaction mixture is desirable since this affords a more even reaction rate and a somewhat shorter reaction time. In addition, agitation facilitates the removal of carbon monoxide from the reaction mixture.

The relative quantities of reactants employed are not critical. An excess of either the molybdenum hexacarbonyl, or the alkali metal halide or tetraalkylammonium halide salt may be used if desired. When the alkali metal halide is employed as a reactant, the ether or ketone solvent, as specified above, is also a reactant in the process. In this case, the ether or ketone reactant is employed in large excess, i.e., in solvent quantities.

The time required for the reaction is dependent upon other process variables which are employed. Thus, an increase in the reaction temperature and an increase in the degree of agitation will cause a proportionate decrease in the reaction time that is required. In practice, it is not difficult to determine the reaction time with reasonable accuracy. This is done by determining the amount of gas which is evolved from the reaction mixture. When a quantity of gas is evolved that is equal to the displacement of one equivalent of carbon monoxide from the molybdenum hexacarbonyl reactant, this shows that the reaction is essentially complete.

The products of our reaction are, in general, solids which are crystalline in nature. They are readily separated from the reaction mass by conventional means such as crystallization followed by filtration, drying, etc. To further illustrate the process of our invention and the products produced thereby, there are presented the following examples in which all parts and percentages are by weight unless otherwise indicated.

*Example I*

A mixture comprising 13.2 grams of molybdenum hexacarbonyl, 8.3 grams of potassium iodide, and 100 mls. of diethyleneglycol dimethylether was heated at reflux under nitrogen for one hour during which time one equivalent (1100 mls.) of gas was evolved. The dark suspension was filtered to remove some black tar-like solids. Petroleum ether was then added to the orange-red filtrate to precipitate pale yellow solids. The total weight of crude product was 35 grams, which indicated a yield in the order of 87 percent. The crude material was recrystallized from diethylether to give fluffy pale yellow solids having a melting point of 100–102° C. The material was soluble in diethyl ether, water, and ethanol, but insoluble in petroleum ether. The infrared spectrum of the product showed three metallocarbonyl bands in the 5 micron region, and two etherate bands in the 9 micron region. On the basis of its infrared spectrum and elemental analysis, the compound was clearly identified as potassium tris-(diethyleneglycol dimethylether) molybdenum pentacarbonyl iodide.

When Example I was repeated employing lithium iodide, sodium iodide, rubidium iodide, and cesium iodide as reactants in place of potassium iodide, there were obtained the corresponding compounds in which a lithium, sodium, rubidium, or cesium cation was bonded to a molybdenum pentacarbonyl iodide anion. In these compounds, diethyleneglycol dimethylether was also present in the molecule so as to stabilize its existence. These compounds are somewhat less stable than the potassium compound described in Example I, and all were somewhat air sensitive pale yellow crystalline solids having similar metallocarbonyl bands in the infrared region.

*Example II*

One mole of tetraethyl ammonium chloride was reacted under nitrogen with a slight excess of molybdenum hexacarbonyl in diethyleneglycol dimethylether solvent at a temperature of approximately 120° C. The reaction mixture was then filtered under nitrogen and the filtrate was allowed to cool. A small quantity (20 mls.) of petroleum ether was then added to the filtrate and there was precipitated the product tetraethylammonium molybdenum pentacarbonyl chloride which was recovered by means of filtration. On analysis of the compound there was found: C, 38.6 percent, H, 5.9 percent which corresponded closely with the calculated values for tetraethylammonium molybdenum pentacarbonyl chloride. On the basis of the compound's elemental analysis, its identity was established as tetraethylammonium molybdenum pentacarbonyl chloride.

Example II was repeated using tetraethylammonium bromide in place of tetraethylammonium chloride. There was obtained the product tetraethylammonium molybdenum pentacarbonyl bromide which gave a carbon and hydrogen analysis that corresponded closely with the calculated values. Similarly, when tetra n-propylammonium iodide or tetraethylammonium iodide are employed as the reactants, there are obtained the compounds tetra n-propylammonium molybdenum pentacarbonyl iodide, and tetraethylammonium molybdenum pentacarbonyl iodide.

When Example II is repeated employing organic solvents such as n-hexane, n-heptane, and n-octane in place of diethyleneglycol dimethylether, the reaction goes to produce the product in good yield.

*Example III*

One mole of molybdenum hexacarbonyl is reacted with a slight excess of sodium iodide in 1,2-dimethoxyethane solvent. The reaction is conducted under nitrogen at about 80° C. with stirring. After one equivalent of carbon monoxide is evolved, the reaction mixture is cooled and filtered. A small quantity of petroleum ether is added to the filtrate to precipitate the product, sodium tris(1,2-dimethoxy ethane) molybdenum pentacarbonyl iodide.

When Example III is repeated employing 3-pentanone as the solvent, there is obtained the sodium 3-pentanone molybdenum pentacarbonyl iodide product. Further, when Example III is repeated employing potassium chloride, and lithium bromide in place of sodium iodide, the corresponding potassium 1,2-dimethoxy ethane molybdenum pentacarbonyl chloride and lithium 1,2-dimethoxyethane molybdenum pentacarbonyl bromide compounds are obtained.

One utility for our compounds is as chemical intermediates. In this use, our compounds can be employed as intermediates in the formation of useful organic compounds.

A further use for our compounds is in metal plating. In this application, our compounds are thermally decomposed in an atmosphere of a reducing gas such as hydrogen or a neutral atmosphere such as nitrogen to form a metal-containing film on a substrate material. The substrate material is heated above the decomposition temperature of the compound and brought into contact with the compound as, for example, dipping the substrate material into a vessel containing the coating compound. Another mode of forming the metal-containing film on the substrate material is to lightly coat the substrate material with the compound after which the coated substrate is heated to a temperature above the decomposition temperature of the compound.

The metal-containing films which are formed from our compounds have a wide variety of applications and may be used in forming conductive surfaces such as employed in a printed circuit, in producing a decorative effect on a substrate material or in forming a corrosion-resistant coating on a substrate material.

A still further utility for our compounds is as catalysts in the preparation of organic compounds.

Having fully defined the novel compounds of our invention, their mode of preparation and their many utilities, we desire to be limited only within the lawful scope of the appended claims.

We claim:

1. Potassium tris(diethyleneglycol dimethylether) molybdenum pentacarbonyl iodide.

2. Process for the formation of potassium tris(diethyleneglycol dimethylether) molybdenum pentacarbonyl iodide, said process comprising reacting potassium iodide with molybdenum hexacarbonyl and diethyleneglycol dimethylether.

3. Process for the preparation of sodium tris(1,2-dimethoxyethane) molybdenum pentacarbonyl iodide, said process comprising reacting sodium iodide with molybdenum hexacarbonyl and 1,2-dimethoxyethane.

4. Sodium tris(1,2-dimethoxyethane) molybdenum pentacarbonyl iodide.

5. Compounds having the formula:

$$M(Y)_a Mo(CO)_5 X$$

wherein:

M is an alkali metal cation;
Y is selected from the class consisting of diethyleneglycol dimethylether, 1,2-dimethoxyethane and 3-pentanone;
X is a halogen, and
$a$ is an integer having the value 2 to 3.

6. Process for the preparation of a compound of claim 5, said process comprising reacting molybdenum hexacarbonyl with an alkali metal halide salt and a reactant selected from the class consisting of diethyleneglycol dimethylether, 1,2-dimethoxyethane and 3-pentanone.

References Cited by the Examiner

Fischer, E. O., and Öfele, K.: Z. Naturforsch., 14b, 736 (1959).

Wilkinson G., Bennett, M. A., and Abel, E. W.: Chem. Ind. (London), p. 442 (1960).

TOBIAS E. LEVOW, *Primary Examiner*.

W. J. VAN BALEN, T. L. IAPALUCCI,
*Assistant Examiners.*